United States Patent [19]

Habermann et al.

[11] 4,114,960

[45] Sep. 19, 1978

[54] RADIAL DISPLACEMENT DETECTOR DEVICE FOR A MAGNETIC BEARING

[75] Inventors: Helmut Habermann, Vernon; Maurice Brunet; Jacques LeClére, both of Forét de Vernon, all of France

[73] Assignee: Societe Europeenne de Propulsion, France

[21] Appl. No.: 764,523

[22] Filed: Jan. 31, 1977

Related U.S. Application Data

[63] Continuation of Ser. No. 582,880, Jun. 2, 1975, abandoned, which is a continuation of Ser. No. 433,791, Jan. 16, 1974, abandoned.

[30] Foreign Application Priority Data

Jan. 18, 1973 [FR] France .................................. 73 01786

[51] Int. Cl.² ............................................ F16C 39/00
[52] U.S. Cl. .................................................... 308/10
[58] Field of Search .............................. 308/10; 74/5.6

[56] References Cited

U.S. PATENT DOCUMENTS

| | | | |
|---|---|---|---|
| 3,079,574 | 2/1963 | Garcia | 308/10 |
| 3,243,238 | 3/1966 | Lyman | 308/10 |
| 3,473,852 | 10/1969 | Lyman | 308/10 |
| 3,490,816 | 1/1970 | Lyman | 308/10 |
| 3,493,275 | 2/1970 | Stone | 208/10 |
| 3,650,581 | 3/1972 | Boden | 308/10 |
| 3,698,775 | 10/1975 | Gilbert | 308/10 |
| 3,731,984 | 5/1973 | Habermann | 308/10 |
| 3,787,100 | 1/1974 | Habermann | 308/10 |

*Primary Examiner*—R. Skudy

[57] ABSTRACT

A device for detecting and correcting a radial oscillations of a rotor, particularly a rotor in a magnetic suspension, for the purposes of creating a restoring force to hold the rotor centrally of the stator, wherein several pairs of radial displacement detectors are coupled together and are relatively spaced such that the signals emanating from diametrically opposite detectors of each pair are cancelled out and the signals emanating from adjacent detectors of each pair are averaged to eliminate the effects of variations in the radius of the rotor.

8 Claims, 6 Drawing Figures

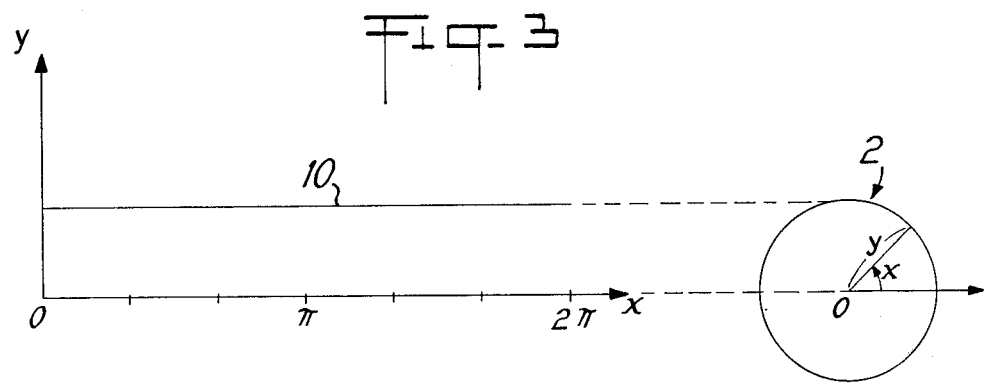
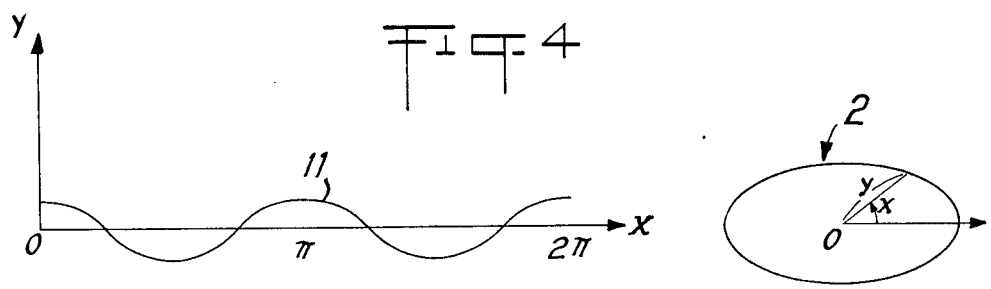
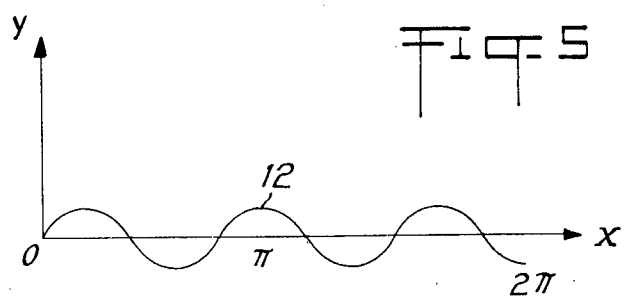

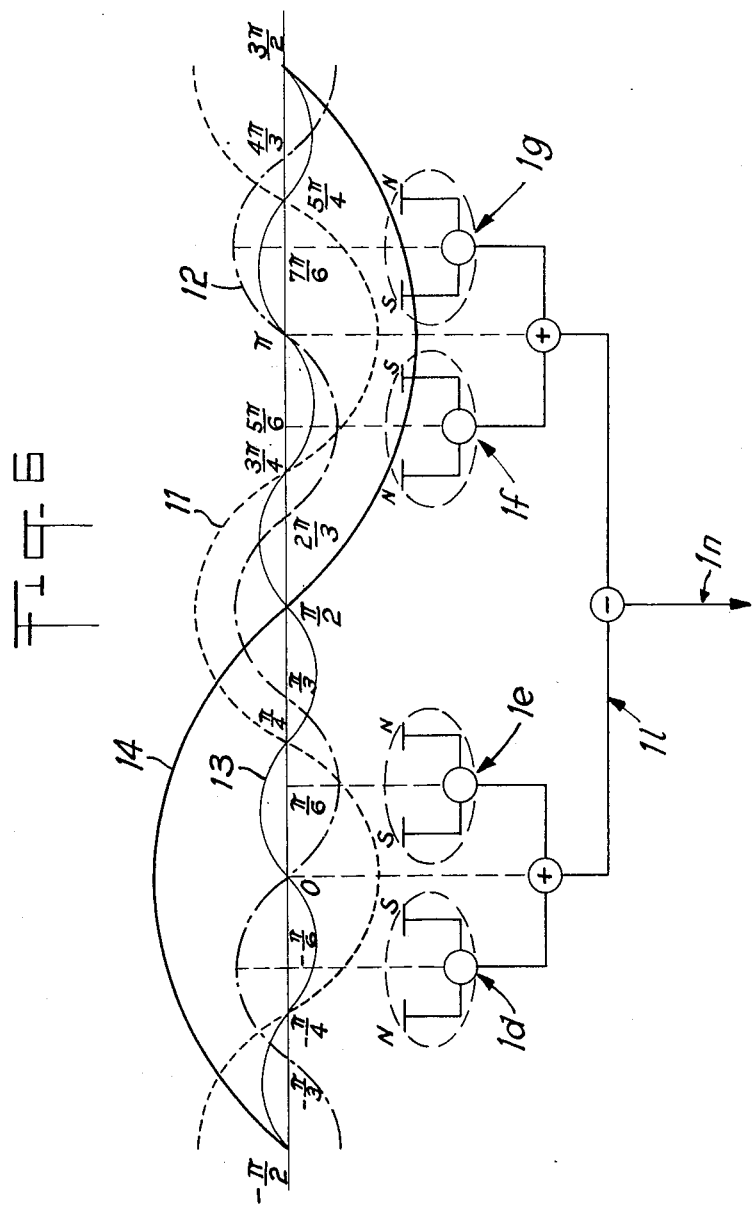

RADIAL DISPLACEMENT DETECTOR DEVICE FOR A MAGNETIC BEARING

This is a continuation, of application Ser. No. 582,880, filed June 2, 1975 now abandoned which is a continuation of application Ser. No. 433,791 filed Jan. 16, 1974 now abandoned.

The present invention relates to an improved detection device for a magnetic bearing, which is intended to detect movements, and more particularly radial movements, of a rotor mounted on magnetic bearings.

In order to detect such movements, it has been known for a long time to use detectors which can be divided into three main categories, namely optical detectors, magnetoinductive detectors and capacitive detectors.

An optical detector usually consists of a lamp illuminating a photo-electric cell, with the lamp beam cut off from view to a greater or lesser extent by an opaque circular screen firmly fixed to the rotor and oscillating radially with the said rotor.

A magnetic detector consists of a magnetic component firmly fixed to the stator, for example a small "U" made of ferrite, which co-operates with a magnetic ring, also for example made of ferrite, so as to complete the magnetic flux circuit between the two arms of the said "U" whilst remaining apart from the "U" shaped component by a space forming an air gap. Variations in the width of the gap, resulting from radial movements of the rotor, alter the magnetic characteristics of the flux circuit and consequently vary the self-inductance of a coil wound around the U-shaped magnetic component.

Finally, a capacitive detector consists of a condenser, one of the plates of which is firmly fixed to the stator and the other to the rotor, the dielectric consisting of the space which separates them, and the variations in the width of the gap, due to radial movements of the rotor, causing changes in the capacity of the said condenser.

These various type of detectors are thus each suitable for detecting a radial movement of a rotor turning in a magnetic bearing and of converting it into an electrical signal which is transmitted to a control device of known type for bringing the said rotor back to its normal position.

Several of these known detectors may be combined, for example by placing two of them diametrically opposite so as to add their signals arithmetically, in fact by algebraic subtraction carried out either electrically or electronically, in order thus to double the sensitivity of the said detector. However, truly valid geometrical arrangements for a plurality of detectors around a circumference centered on the theoretical axis of rotation have on the other hand never been proposed. The known devices described above would provide a satisfactory solution only if the geometry of the rotor were perfectly cylindrical. This condition cannot be achieved in practice because it is impossible to machine components of rigorous geometry.

Taking into account the lack of rigorous circularity of the bearings and rotors, it is no longer possible to define the position of the axis of the rotor with the necessary accuracy. However, these known detection devices are incapable of distinguishing between variations in their reference distance generated by a radial shift of the axis of the rotor, and a movement which in reality corresponds only to a simple dimensional variation in the radius of the rotor and thus they can, in a case where the axis of the rotor is perfectly aligned, themselves generate a vibration of the axis about its original position by a spurious control signal due to their detection of the non-circularity of the rotor.

These spurious detections are the cause of a substantial increase in the power consumption of the control device, and this is particularly detrimental in the case of use with a limited source of energy, such as in a satellite.

Thus, the aim of the present invention is to propose an improved detection device which is suitable for detecting only variations in the so-called reference distances resulting from a true radial movement of the axis of the rotor and not those due to variations in the radius of the rotor.

According to the present invention there is provided a device for detecting radial oscillations of a rotor relative to a stator along a diametral reference plane of the stator comprising $2^{(x)}$ pairs of detectors fixed to the stator and symmetrically arranged with respect to the reference plane, each pair consisting of two detectors placed diametrically opposite one another relative to the axis of rotation of the rotor and responsive to changes in the radial positioning of a periphery of the rotor during rotation; the $2^{(x)}$ detector pairs being arranged as $2^{(x-1)}$ class 1 groups each consisting of two pairs of detectors with the diameter joining the two detectors of one pair angularly displaced from that of the other pair by an angle of $$\frac{360}{2[1+2x]}°;$$

$2^{(x-2)}$ class 2 groups, each consisting of two class 1 groups with the diametral axis of symmetry (as hereinafter defined) of one of said class 1 groups angularly displaced from that of the other group by an angle of $$\frac{360}{2[1+2(x-1)]}°$$

generally $2^{(x-a)}$ class $a$ groups each consisting of two class $(a-1)$ groups with the diametral axis of symmetry (as hereinafter defined) of one of said class $(a-1)$ groups angularly separated from that of the other groups by an angle of $$\frac{360}{2[1+2(x-a+1)]}°;$$

down to the two class $(x-1)$ groups being arranged as one class $x$ group consisting of 2 class $(x-1)$ groups with the diametral axis of symmetry (as hereinafter defined) of one of said class $(x-1)$ groups angularly separated from that of the other class $(x-1)$ group by an angle of $$\frac{360}{2[1+2]}°;$$

where $x$ is a positive integer such that all the odd "harmonics" as hereinafter defined are eliminated up to the $(1+2x)$ harmonic and $a$ is an integer and $1 \leq a \leq x$; the two diametral axes of symmetry of the class $(x-1)$ group being placed symmetrically with respect to said diametral reference plane so that said reference plane contains the diametral axis of symmetry (as hereinafter defined) of the class $x$ group; the various detectors being connected together so that all those detectors which are symmetrically disposed around one diametral end of said reference plane are connected together to have their signals algebraically added and all the remaining detectors which are symmetrically arranged about the other diametral end of said reference plane are also connected together to have their signals algebraically added, and the resultant signal from the detectors at one end of the reference plane is algebraically subtracted from the resultant signal of the said remaining detectors at the other end of the reference plane.

The term "diametral axis of symmetry" of any group, for example a class $(a-1)$ group, denotes that one of the two diametral axes of symmetry of the group which bisects the smallest sector to embrace one detector from each of the detector pairs constituting said group.

In this way, according to the present invention the essential advantage is achieved of eliminating from the signal transmitted by the detection device to the control device controlling the magnetic bearings, all the disturbances originating from dimensional variations in the radius of the rotor.

In fact, it is known from theory that a curve can generally be broken down into a Fourier series, in which the amplitudes are decreasing for the majority of the time.

Thus if it is assumed that the cylinder forming the rotor is unwound (i.e. a development is formed) and the variations in its radius in a cross-sectional plane perpendicular to its axis, are plotted on a graph as the ordinate, as a function of the corresponding polar angle plotted as the abscissa, it is possible to consider the usually very small defects (of the order of a few microns) in the circularity of the cross-section of the rotor as being due to superposition, on a first fundamental circle of theoretically perfect cross-section, of a series of sinusoidal curves of wavelength equal to the successive whole fractions of the perimeter of the said circle. These curves are commonly called "harmonics" because as the rotor rotates they will generate signals of frequencies which are multiples of those generated by the off-centre position of the axis of the rotor.

The invention also provides a device for detecting radial oscilations of a rotor relative to a stator, comprising several pairs of detectors firmly fixed to the stator each pair consisting of two detectors placed diametrically opposite one another relative to the axis of rotation of the said rotor, the said pairs being grouped in twos in such a way that, for at least one particular reference diametral plane, there is a combination of four detectors situated in one and the same plane perpendicular to the said axis of rotation, the said detectors being connected in such away that in each pair of detectors the signals transmitted by two detectors from that pair are subtracted algebraically from one another whilst the signals transmitted by two pairs from one and the same group of two pairs are added algebraically to one another, the median diametral planes joining the detectors of each of the pairs of the said group of two pairs each make an angle of 30° with the said reference diametral plane relative to which the said median planes are symmetrical and the signals of two detectors placed symmetrically relative to the said reference plane are added algebraically so that the overall signal transmitted by the said group of two pairs is related to the movement of the axis of the rotor in the said reference plane. The detection of the radial movements of the axis of the rotor is affected only by periodic variations in the radius of the said rotor of a frequency at least equal to five times that of the rotation of the rotor and it will consequently be possible to eliminate them thereafter in a manner which is in itself known, by a suitable filtering of the signal.

The invention further provides a device for detecting radial oscillations of a rotor relative to a stator comprising several pairs of detectors firmly fixed to the stator each pair consisting of two detectors placed diametrically opposite one another relative to the axis of rotation of the said rotor, the said pairs being grouped in twos in such a way that in at least one particular reference diametral plane there is a combination of eight detectors situated in one and the same plane perpendicular to the said axis of rotation in such a way that the four median diametral planes joining the detectors of each of the pairs are symmetrical two by two relative to the said reference diametral plane with which the said median planes each make an angle of 12° in the case of the pairs of the group of two pairs, or of 48° in the case of the pairs of the second group of two pairs, the said detectors being connected in such a way that in each pair the signals transmitted by the two detectors are subtracted algebraically from one another whilst the signals transmitted by two pairs from one and the same group of two pairs are added algebraically to one another, the signals of two detectors placed symmetrically relative to the said reference plane being added algebraically and the signals transmitted by the two groups of two pairs being added algebraically to one another in such away that the overall signal transmitted by the combination of the eight detectors is related to the movement of the axis of the rotor in the said reference plane.

In order that the present invention may more readily be understood there follows a description, given purely by way of example, with reference to the accompanying drawings in which.

FIGS. 3, 4, 5, and 6 represent, on different graphs the fundamental and the successive harmonics, the superposition of which forms the cross-section of a rotor at the level of the detector.

Figure 1:
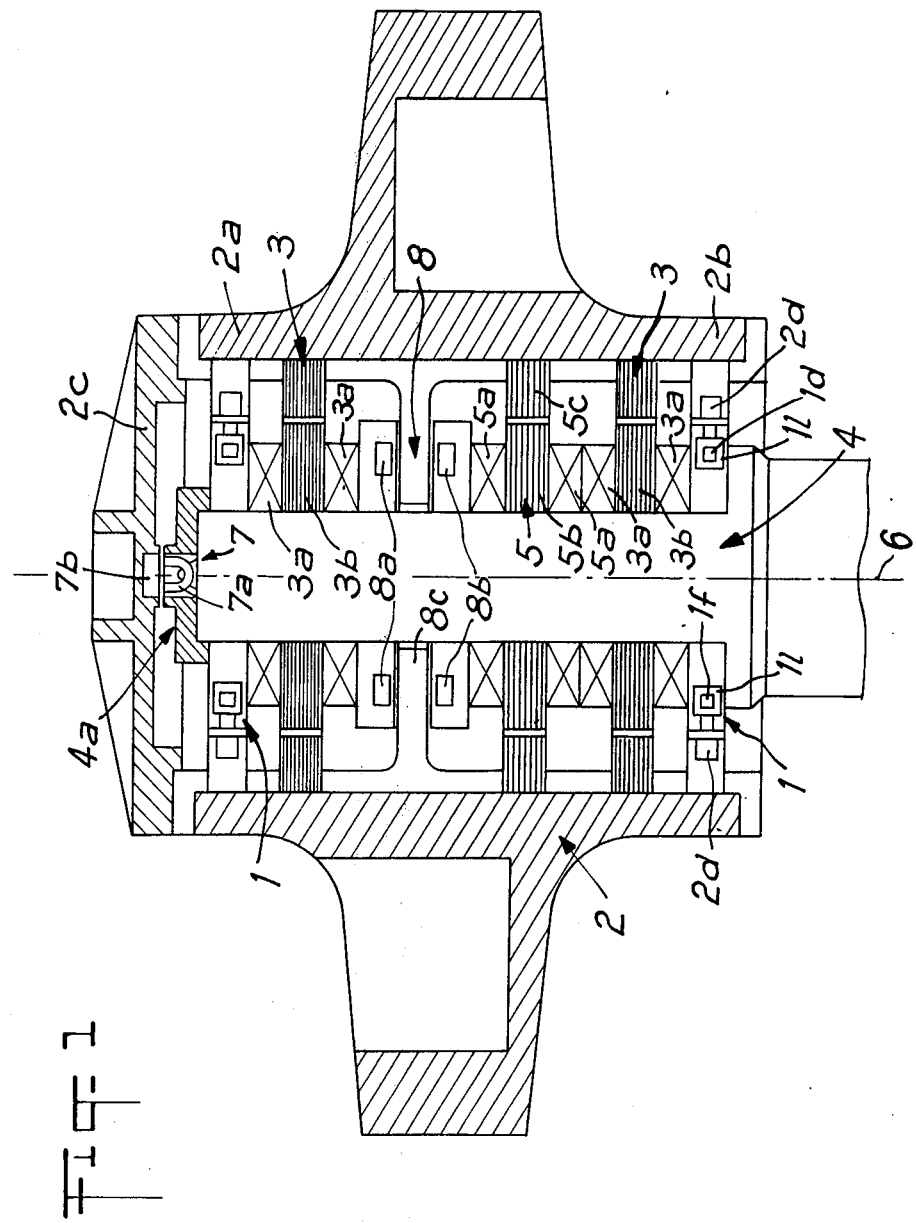
FIG. 1 is an axial cross-section of a magnetic bearing equipped with the detection device of the invention.

As can be seen in FIG. 1, a radial movement detector 1 according to the present invention can be placed at the level of each of the two ends 2a and 2b of a rotor 2 mounted by means of magnetic bearings 3 on a stator 4.

Each of the bearings 3 consists of windings 3a wound around a magnetic material 3b consisting of a stack of magnetic metal laminations.

A motor 5 consisting of windings 5a wound around a magnetic material 5b drives the rotor 2 for rotation about the axis 6 due to the forces which it exerts on the magnetic material 5c firmly fixed to the rotor 2.

The axial position of the rotor 2 is controlled by an axial magnetic detector 7 consisting of a "U" shaped magnetic component 7a, for example made of ferrite, firmly fixed to the upper end 4a of the stator 4, around which is wound an induction coil (not shown), which co-operates with a circular component 7b, made of ferrite, and placed opposite the said "U"- shaped component 7a, so as to complete the magnetic flux circuit of the component 7a. The component 7a is mounted firmly fixed to the central part of the upper end forming the cap 2c of the rotor 2.

This axial magnetic detector 7 controls, by means of a control circuit (not shown) of a known type, the flux density flowing in the two coils 8a and 8b of an annular electro-magnet 8 which is integral with the stator 4 and which has in its air gap a ring 8c made of magnetic material firmly fixed to the rotor 2.

Figure 2:
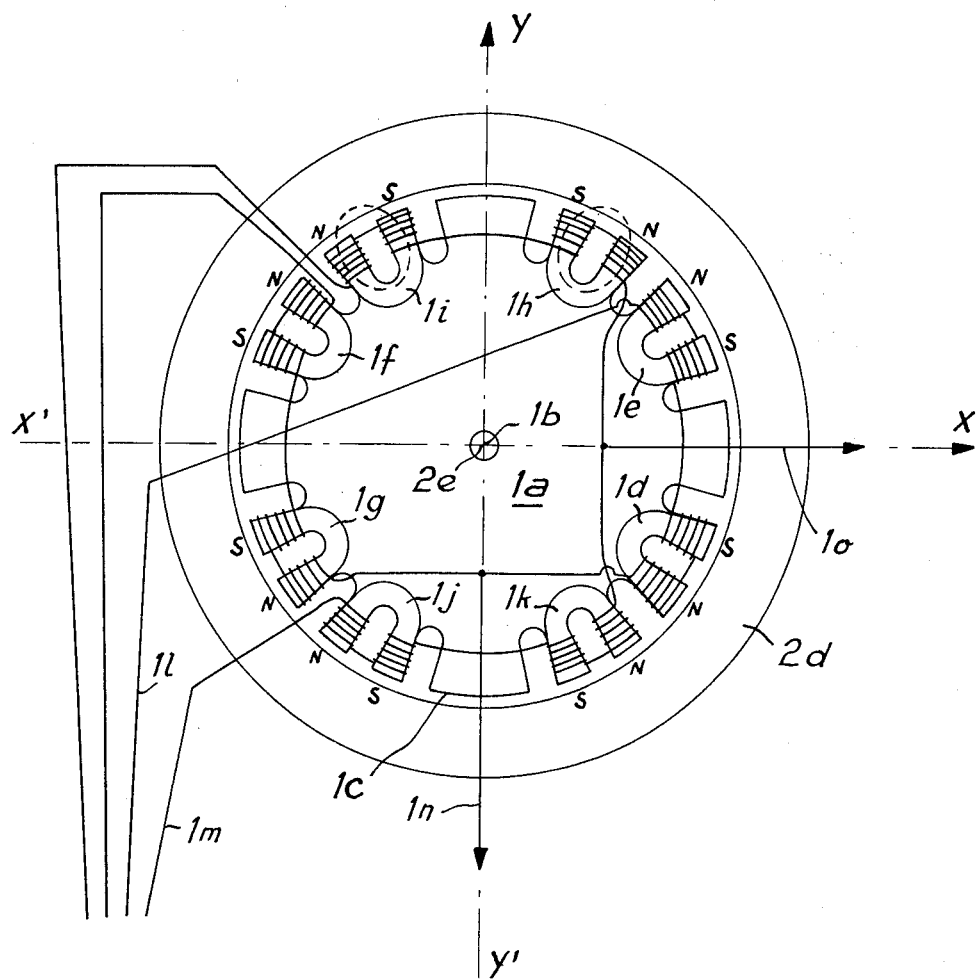
FIG. 2 is a plan view of the detection device of the bearing of FIG. 1.

As shown in FIG. 2 each of the radial movement detectors 1 of the rotor 2 consists of a disc 1a mounted at centre 1b situated on the theoretical axis of rotation of the rotor 2. The disc 1a is placed perpendicularly to the said axis of rotation and is firmly fixed to the stator 4.

Eight detectors 1d, 1e, 1f, 1g, 1h, 1i, 1j and 1k, each consisting of a small "U"-shaped magnetic compenent, for example made of ferrite, are placed on the circumference 1c of the disc 1a. All these small "U"-shaped components are placed in the plane of the disc 1a so that the hollow of their "U" faces away from the centre 1b of the disc 1a and so that the ends of the two branches of their "U" pointing radially, are situated on the circumference 1c of the said disc 1a.

These eight detectors are intended to co-operate with a circular ring 2d of magnetic material, for example ferrite, situated in the same plane as the disc 1a and firmly fixed to the rotor 2.

In the ideal theoretical position of the rotor, the centre 2e of the circular ring 2d must be situated on the axis of rotation and must thus overlie the centre 1b of the detection device 1 which is intended to detect the radial movements of this centre 2e relative to the fixed center 1b.

Since the disc 1a is located with reference to the two perpendicular axes $x'x$ and $y'y$ passing through the centre 1b of the said disc 1a, as is represented in FIG. 2, the four detectors 1d, 1e, 1f and 1g are intended to detect the movements of the centre 2e along a direction parallel to axis $x'x$ whilst the remaining four detectors 1h, 1i, 1j and 1k are intended to detect the movments of the said centre 2e along a direction parallel to axis $y'y$.

For this purpose, the pair of detectors 1d and 1e are fixed to the disc 1a so as to have their plane of symmetry passing through the perpendicular to the disc 1a, at the centre 1b of the disc 1a, and so that the lines of intersection of the said radial planes of symmetry with the reference plane $x'x$, $y'y$ make angles of 30° with the axis $x'x$. The straight line of each of these intersections coming from the centre 1b and cutting the detector 1d, or the detector 1e, forms an algebraic angle of $-30°$, or respectively of $+30°$, with the half straight line $1b-x$.

Similarly the two detectors 1f and 1g are fixed to the disc 1a symmetrically relative to both the perpendicular to the disc 1a, at its centre 1b, and to the respective detectors 1d and 1e.

The four detectors 1h, 1i, 1j and 1k are fixed in the same positioning relative to the axis $y'y$ as are the four detectors 1d, 1e, 1f and 1g, respectively, relative to the axis $x'x$. In other words, their position can be deduced respectively from that of each of the above four detectors by a rotation of 90° around the centre 1b of the disc 1a.

A wire 1l is wound successively around each of the branches of the four detectors 1d, 1e, 1f and 1g mounted in series in the order 1e, 1d, 1g 1f. The two ends of the wire 1l are connected to a generator of a type which is in itself known and which is not represented. The coils of the wire 1l around each of the branches of the detectors are wound in such a way that, when that detector is connected to the generator, a north pole appears on one of the branches and a south pole appears on the other branch of each detector, the north and the south poles being placed symmetrically relative to the axis $x'x$ and to the axis $y'y$ as is represented in FIG. 2 by the reference letters N and S.

Likewise, a wire 1m is wound successively around each of the branches of the four detectors 1h, 1i, 1j and 1k mounted in series in the order 1j, 1k, 1h 1i. The two ends of the wire 1m are connected to a generator of a type which is in itself known and which is not represented. The coils of the wire 1m around each of the branches of the detectors are wound in such a way that, when it is connected to the said generator, a north pole appears on one of the branches and a south pole on the other branch of each of the detectors, the north and south poles being placed symmetrically relative to the axis $x'x$ and to the axis $y'y$ as is represented in FIG. 2 by the reference letters N and S.

A wire 1n intended to transmit the signal corresponding to movements parallel to the axis $x'x$ of the centre 2e detected by the group of two pairs of detectors formed by the pairs consisting of the detectors 1d-1f and 1e-1g is connected at one of its ends to the wire 1l between the detectors 1d and 1g at its other end to a control circuit which is in itself known and which is not represented.

Likewise, a wire 1o intended to transmit the signal corresponding to movements parallel to $y'y$ of the centre 2e detected by the group of two pairs of detectors formed by the pairs consisting of the detectors 1h-1j and 1i-1k is connected at one of its ends to the wire 1m between the detectors 1k and 1h and at its other end to a control circuit which is in itself known and which is not represented.

It follows from what is stated above that the apparatus functions in the following way:

If the rotor perfectly circular a reference system in which the polar angle subtended between any radius whatsoever and a particular reference radius is plotted as abscissa, and the length of the said radius is plotted as ordinate, as in FIG. 3, the curve 10 obtained will be a line parallel to Ox of ordinate equal to the radius of the said rotor.

Now if instead the rotor has a slightly oval, for example elliptical, shape teaches that the variations $\Delta y$ of the radius of the rotor as a function of the polar angle subtended by the said radius are then represented by a sinusoidal curve 11 (see FIG. 4) with a period equal to 180°, that is to say half of the length of the curve 10.

In the limiting case, any variation whatsoever of the said radius as a function of the corresponding polar angle can be considered as being the superposition of a very large number of sinusoidal curves with periods equal to successive whole fractions of 360°, for example, the curves 12 and 13 in FIG. 6 having respective periods (360°/3) = 120°, and (360°/4) = 90°.

It can thus be understood that these periodic variations of the radius will give rise to corresponding periodic variations of the width of the air gap of the magnetic detectors during the rotation of the rotor, and the frequency of these variations will thus be a multiple of that of the rotor and are thus referred to as harmonics.

It is thus seen that the facts of placing detectors diametrically opposite one another and of connecting them in opposition, as are the two detectors forming each pair, so that the signals which they emit are subtracted algebraically, eliminates at the very start all the even "harmonics" of the resultant signal; in fact, it can be seen in the Figures that since, in the case of all the even harmonics, these two detectors are separated by a whole number of wavelengths of the sinusoides of the said "harmonics", they will detect the same thing and will thus transmit two identical signals, the subtraction of which will thus be zero.

However, in addition, and it is on this point that the invention hinges; it can also be seen that two detectors which are spaced 60° apart, and are connected in series so that the signals which they emit are added algebraically as is each of the detectors of one group of two pairs relative to one of the detectors of the other pair of the same group of two pairs, are separated by half a wavelength with respect to the third harmonic, and that they thus detect opposite quantities and thus transmit opposite signals, the sum of which will consequently be zero.

Of course, this phenomenon will occur again for any higher uneven "harmonic" generally the $(1+2x)$ harmonic where $x$ is an integer so that $(1+2x)$ is an odd number greater than 3. Thus, in order to eliminate all the odd "harmonics" up to and including the $(1+2x)$ "harmonic" it will suffice to replace each of the detectors necessary to eliminate the previous uneven harmonic (i.e. the $[1+2(x-1)]$ harmonic) by two detectors which will have their signals added and which will be placed symmetrically relative to the position of the single detector which they replace, being spaced apart from one another by half a wavelength for the said harmonic, in other words by $$\frac{360}{2(1+2x)}.$$

Thus for the 5th harmonic the spacing between the two detectors of a pair will be $$\frac{360}{2(1+4)} = \frac{360}{10}$$

i.e. 36°. Since for the third harmonic each detector is placed at ±30° relative to a radial plane of symmetry, each of these detectors will be replaced by a pair of detectors 36° apart but symmetrically disposed around the siting of the corresponding third harmonic detector i.e. at ±(30° + 18°) and ±(30° − 18°), more specifically ±48° and ±12°. The one or more pairs of detectors for eliminating the desired harmonics comprise a detecting unit.

Depending upon the value of $x$, there is no reason why the angles obtained should be an integral number of degrees of angle.

FIG. 6 shows on one and the same graph the four curves 14, 11, 12 and 13 corresponding respectively to the signals relating to an off-centering of the axis of the rotor relative to that of the detectors and which forms the fundamental or first "harmonic" (curve 14), and to those relating to a non-circularity of the said rotor about its axis of elliptical type ("second harmonic", curve 11), of "pear-shaped" or triangular type ("third harmonic", curve 12) or of square type ("fourth harmonic", curve 13).

The detectors 1d, 1e, 1f and 1g forming the group of two pairs ensuring the detection of movements of the rotor along $x'x$ have been represented diagrammatically in this Figure in the positions corresponding to those which they occupy on the stator 4. The arrows and the operational signs indicated show the transmissions and the operations which are carried out from the signals transmitted by the detectors by means of the connections described above.

In another embodiment of the present invention, the eight detectors 1d, 1e, 1f, 1g, 1h, 1i, 1j and 1k, and the disc 1a on which they are fixed, can be replaced for economical reasons by a single stack of metal sheets cut out to have the same shape as that indicated in FIG. 2 and thus possessing a succession of radial lugs replacing the branches of the detectors and around which the wires 1l and 1m are wound as indicated above.

Likewise, and for the same reasons, the ring 2d firmly fixed to the rotor can consist of a single conducting ring which may or may not be magnetic.

From the above it will be seen that in order to eliminate all the even "harmonics" and all the odd harmonics up to and including a particular one, generally the $(1+2x)$ "harmonic" where $x$ is a positive integer, each reference plane must be associated with $2^{(x)}$ detector pairs and the positioning of the detectors can be analysed as a series having the first two terms as:

(i) $2^{(x-1)}$ class 1 groups each consisting of two pairs of detectors with the diameter joining the two detectors of one pair angularly displaced from that of the other pair by an angle of $$\frac{360}{2(1+2x)}°;$$

(ii) $2^{(x-2)}$ class 2 groups, each consisting of two class 1 groups with the diametral axis of symmetry (as hereinbefore defined) of one of said class 1 groups angularly displaced from that of the other group by an angle of $$\frac{360}{2[1+2(x-1)]}°;$$

there class 2 groups being arranged as . . .

The last term of the series is: . . . one class $x$ group consisting of 2 class $(x-1)$ groups with the diametral axis of symmetry (as hereinbefore defined) of one of said class $(x-1)$ groups angularly separated from that of the other class $(x-1)$ group by an angle of $$\frac{360}{2[1+2]}°;$$

where the two diametral axes of symmetry of the class $(x-1)$ group are placed symmetrically with respect to said diametral reference plane so that said reference plane contains the diametral axis of symmetry (as hereinbefore defined) of the class $x$ group.

The general term of this series is:

a set of $2^{(x-a)}$ class $a$ groups each consisting of two class $(a-1)$ groups with the diametral axis of symmetry (as hereinbefore defined) of one of said class $(a-1)$ groups angularly separated from that of the other group by an angle of $$\frac{360}{2[1+2(x-a+1)]}°;$$

where $a$ is a positive integer and $1 \leq a \leq x$.

It must be understood that each of the terms of this series constitutes a different way of defining the position of the same $2^{(x)}$ pairs of detectors, but all terms of the series must be applicable to the detector to satisfy the overall requirements of the present invention.

The various detectors must be connected together so that all those detectors which are symmetrically disposed around one diametral end of each reference plane are connected together to have their signals algebraically added and all the remaining detectors which are symmetrically arranged about the other diametral end of the same reference plane are also connected together to have their signals algebraically added, with the resultant signal from the detectors at one diametral end of the reference plane being algebraically subtracted from the resultant signal of the said remaining detectors at the other diametral end of the reference plane.

In FIG. 2, $x$ is 1 and the third harmonic and all the even harmonics are eliminated.

We claim:

1. A device for detecting radial displacement of a rotor relative to a stator and for creating a diametral restoring force for correcting the positioning of the rotor comprising a rotor; a stator; means for generating a control force on the rotor along a diametral plane of the stator; means controlling said force; and means for detecting the position of the rotor and for transmitting an error signal to said force controlling means; said detecting means comprising a plurality of pairs of detectors fixed to the stator and symmetrically arranged about said diametral plane, each pair consisting of two detectors placed diametrically opposite one another relative to the axis of rotation of the rotor; the detectors being connected together so that the two detectors of each pair of detectors have their signals algebraically subtracted one from the other and the two detectors of each couple of detectors consisting of two detectors symmetrically arranged about said diametral plane of the stator have their signals algebraically added; said pairs of detectors being arranged to constitute at least a first and a second detecting unit each including the same number of pairs of detectors; the pairs of detectors constituting the first and second detecting units being symmetrically arranged about a first and a second diametral axis of symmetry respectively and said first and second diametral axes of symmetry being places symmetrically with respect to said diametral plane and being each angularly displaced therefrom by an angle of 30°, where the term diametral axis of symmetry of a detecting unit denotes that one of the two diametral axes of symmetry of this unit bisects the smaller sector embracing one detector of each pair of detectors constituting this unit whereby odd harmonics are eliminated as well as all of the even harmonics.

2. A device as set forth in claim 1 wherein each of said first and second detecting units is constituted by one pair of detectors, the diametral plane of symmetry of each detecting unit being the diametral plane joining the two detectors of the pair of detectors constituting the unit.

3. A device as set forth in claim 1 wherein each of said first and second detecting units is constituted by two pairs of detectors the diametral planes joining the detectors of both pairs of of one detecting unit being angularly displaced from each other by an angle of 36°.

4. A device as set forth in claim 1 further comprising a third and fourth detecting unit each including the same number of pairs of detectors, the detectors of the first and second detecting units and the detectors of the third and fourth detecting units being symmetrically arranged about two respective perpendicular diametral planes.

5. A device as set forth in claim 1 wherein the detectors are magnetic detectors consisting of "U"-shaped ferrite components having at least one induction coil wound therearound.

6. A device as set forth in claim 1, wherein the detectors consist of lugs made of superposed metal laminations each having wound thereabout an electrically conductive wire.

7. A device as set forth in claim 1, wherein said rotor has a part which is situated in a single cross-sectional plane and is made of an electrically conductive material, and wherein said detectors are arranged around said part of the rotor.

8. A device as set forth in claim 7, wherein said electrically conductive material is magnetic.

* * * * *